(12) United States Patent
Osborn (10) Patent No.: US 7,013,464 B2
(45) Date of Patent: Mar. 14, 2006

(54) METHOD OF COMMUNICATING ACROSS AN OPERATING SYSTEM

(75) Inventor: Andrew R. Osborn, Binfield (GB)

(73) Assignee: Beptech, Inc., Grand Rapids, MI (US)

( * ) Notice: Subject to any disclaimer, the term of this patent is extended or adjusted under 35 U.S.C. 154(b) by 678 days.

(21) Appl. No.: 09/982,601

(22) Filed: Oct. 18, 2001

(65) Prior Publication Data

US 2003/0079010 A1    Apr. 24, 2003

Related U.S. Application Data

(60) Provisional application No. 60/329,978, filed on Oct. 17, 2001.

(51) Int. Cl.
*G06F 9/46*    (2006.01)

(52) U.S. Cl. .................. 718/102; 718/106; 719/319

(58) Field of Classification Search ............... 709/201, 709/212, 213, 216, 224, 245; 719/319; 712/28; 718/102, 106
See application file for complete search history.

(56) References Cited

U.S. PATENT DOCUMENTS

| | | |
|---|---|---|
| 4,276,594 A | 6/1981 | Morley |
| 4,757,497 A | 7/1988 | Beierle et al. |
| 5,276,789 A | 1/1994 | Besaw et al. |
| 5,296,936 A | 3/1994 | Pittas et al. |
| 5,386,566 A | 1/1995 | Hamanaka et al. |
| 5,557,778 A | 9/1996 | Vaillancourt |
| 5,594,870 A | 1/1997 | Harris, Jr. et al. |
| 5,596,723 A | 1/1997 | Romohr |
| 5,617,418 A | 4/1997 | Shirani et al. |
| 5,737,605 A | 4/1998 | Cunningham et al. |
| 5,784,557 A | 7/1998 | Oprescu |
| 5,802,391 A | 9/1998 | Hwang |
| 5,884,046 A * | 3/1999 | Antonov ............... 709/238 |
| 5,933,607 A | 8/1999 | Tate et al. |
| 5,953,340 A | 9/1999 | Scott et al. |
| 5,978,570 A * | 11/1999 | Hillis ............... 711/200 |
| 5,991,820 A | 11/1999 | Dean |
| 6,012,101 A | 1/2000 | Heller et al. |
| 6,016,464 A | 1/2000 | Richardson |
| 6,021,495 A | 2/2000 | Jain et al. |
| 6,052,380 A | 4/2000 | Bell |

(Continued)

OTHER PUBLICATIONS

PCT International Search Report, International Application No. PCT/US01/32539; International Filing Date Oct. 18, 2001.

(Continued)

*Primary Examiner*—Marc D. Thompson
(74) *Attorney, Agent, or Firm*—Howard & Howard (57) ABSTRACT

A method of communicating across an operating system using a plurality of processes and a plurality of memory sources disposed within one or more processors is disclosed. The method includes the steps of detecting an event within the system and extracting an initial process address and an initial data address from one of the memory sources to determine a location of an initial process and initial data. Once the operating system knows which process is to be executed and which data to use, the operating system executes executable code of the initial process located at the initial process address. Next, a second process address and a second data address are extracted from one of the memory sources to determine a location of second data to use in a second process prior to the completion of the execution of the executable code of the initial process.

35 Claims, 8 Drawing Sheets

U.S. PATENT DOCUMENTS

| | | |
|---|---|---|
| 6,061,685 A | 5/2000 | Fantenberg |
| 6,067,585 A | 5/2000 | Hoang |
| 6,067,595 A | 5/2000 | Lindenstruth |

OTHER PUBLICATIONS

U.S. Appl. No. 09/692,852, filed on Oct. 20, 2000, Distributed MultiProcessing System.

Publication entitled *"Virtual Memory Mapped Network Interface for the SHRIMP Multicomputer"* by M. A. Blumrich, Kai Li, R. Alpert, C. Dubnicki, and E. W. Felten of Department of Computer Science, Princeton University, Princeton, NJ 08544 and Jonathan Sandberg of Panasonic Technologies, Inc., 2 Research Way, Princeton, New Jersey 08540.

* cited by examiner

METHOD OF COMMUNICATING ACROSS AN OPERATING SYSTEM

RELATED APPLICATIONS

This application claims priority to and all benefits of U.S. Provisional Application Ser. No. 60/329,978, filed on Oct. 17, 2001,

BACKGROUND OF THE INVENTION

1. Field of the Invention

The subject invention relates to a method of communicating across an operating system, and more specifically communicating across an operating system using a plurality of processes and a plurality of memory sources disposed within one or more processors.

2. Description of the Related Art

Data processing and distribution is utilized in a number of different manufacturing and business related applications for accomplishing a virtually unlimited variety of tasks, or processes. Systems implemented to accomplish these tasks utilize different design configurations and are typically organized in a network fashion. Networks may be arranged in a variety of configurations such as a bus or linear topology, a star topology, ring topology, and the like. Within the network there are typically a plurality of nodes and communication links which interconnect each of the nodes. The nodes may be computers, terminals, workstations, actuators, data collectors, sensors, or the like. The nodes typically have a processor, a memory source, and various other hardware and software components. The nodes communicate with each other over the communication links within the network to obtain and send information.

A primary deficiency in the related art systems is in the manner in which nodes communicate with other nodes. Currently, a first node will send a signal to a second node requesting information. The second node is already processing information such that the first node must wait for a response. The second node will at some time recognize the request by the first node and access the desired information. The second node then sends a response signal to the first node with the attached information. The second node maintains a copy of the information which it may need for its own processing purposes. The second node may also send a verification to ensure that the information data was received by the first node.

This type of communication may be acceptable in a number of applications where the time lost between the communications of the first and second nodes is acceptable. However, in many applications, such as real time compilation of data during vehicle testing, this lag time is unacceptable. Further, the redundancy in saving the same data in both the second and first nodes wastes memory space and delays processing time. Finally, the two way communication between the first and second nodes creates additional delays and the potential for data collision.

Accordingly, it would be advantageous to provide an operating system capable of overcoming the deficiencies of the related art. Specifically, an operating system is desired which eliminates the delay between the communications of the first and the second nodes and can optimize usage of memory sources and reduce processing time.

SUMMARY OF THE INVENTION AND ADVANTAGES

A method of communicating across an operating system using a plurality of processes and a plurality of memory sources disposed within one or more processors is provided. The method includes the steps of detecting an event within the system, extracting an initial process address from one of the memory sources to determine a location of an initial process in response to detecting the event, and extracting an initial data address from one of the memory sources to determine a location of initial data to be used in the initial process in response to detecting the event. Executable code of the initial process located at the initial process address is executed and extracts a second process address from one of the memory sources to determine a location of a second process to execute prior to the completion of the execution of the executable code of the initial process.

The subject invention provides a method of communicating across an operating system which virtually eliminates any delay between the communications of different processes on different nodes. Furthermore, the subject invention optimizes the usage of memory sources while reducing processing time by knowing the locations of the next process prior to completing the executing process.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
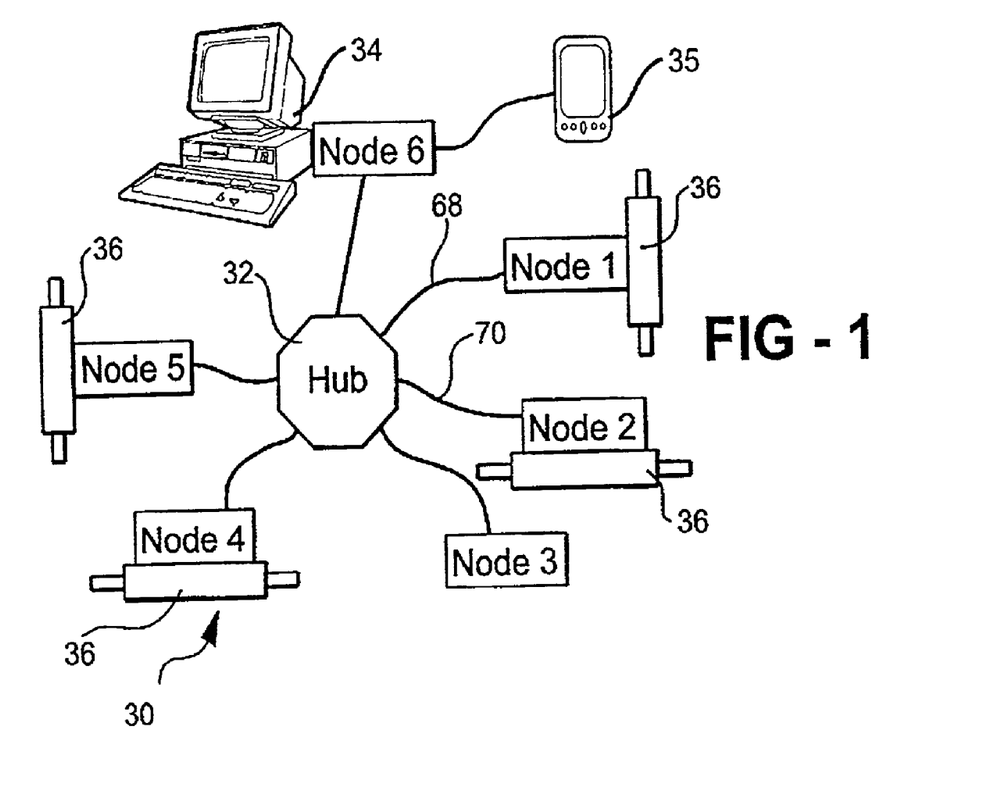
FIG. 1 is a schematic view of an operating system utilizing six nodes interconnected to a single hub.

Referring to the Figures, wherein like numerals indicate like or corresponding parts throughout the several views, a method of communicating across an operating system 30 using a plurality of processes and a plurality of memory sources disposed within one or more processors is disclosed. The operating system 30 capable of performing the method is schematically shown in FIG. 1.

The operating system 30 comprises a plurality of modules or nodes 1–6 interconnected by a central signal routing hub 32 to preferably create a star topology configuration. As illustrated, there are six nodes 1–6 connected to the hub 32 with each of the nodes 1–6 being indexed with a particular node address. As an example of a node address, numerical indicators 1 through 6 are illustrated. As appreciated, any suitable alpha/numeric indicator may be used to differentiate one node from another. The shape, configuration, and orientation of the hub 32, which is shown as an octagon shape, is purely illustrative and may be altered to meet any desired need.

The nodes 1–6 may be part of a workstation or may be the workstation itself. Illustrative of the versatility of the nodes 1–6, node 6 is part of a host computer 34, nodes 1, 2, 4, and 5 are connected to actuators 36 and node 3 is unconnected. It should be appreciated that the nodes 1–6 can be connected to any type of peripheral device or devices including multiple computers, actuators, hand held devices, and the like. For example, node 6 is shown also connected to a hand held device 35. Alternatively, none of the nodes 1–6 could be connected to a peripheral device which would create a completely virtual system. The peripheral devices may be any suitable device as is known in the computer arts such as a monitor, a printer, a key board, a mouse, etc.

Each of the nodes 1–6 include at least one processor having at least one memory source. The processes are able to read and write to the memory source where the process is located. The process only writes to the other memory sources. The method of communicating is through sending signals, or writing data. The signals may be a virtual analogy to analog signals, which may not be synchronized. The signal may contain only the instantaneous value of the signal and may be sampled by any of the processes as required. The signal may be sent from a process to one of the memory sources in any of the nodes 1–6. For example, the process may be running in the same node, or in a remote node. The signal may be sampled by another process executing in the node which receives the signal. Therefore, the process can be executing on a local or remote node, but the signal is still written. The signals, or data, are written to the destination address at whatever moment in time the process sends the signal or data. The signal must be considered to have the value as sampled by another process at whatever moment in time the sampling occurs.

There is no restriction on the type of the processors. The processors may be hardware such as microprocessors, or software virtual processors or any other type of processor as is known in the art. The processors may be of different sizes and speeds. For example, node 6 may have a 1,500 MFlops processor and the remaining nodes may have a 300 MFlops processors. The size and speed of the processor may be varied to satisfy a multitude of design criteria. Typically, the processor will only be of a size and speed to support the processes which are associated with the node 1–6. Further, the processors can be of different types which recognize different computer formats and languages.

A platform interconnects the nodes 1–6 of the operating system 30. Additionally, the platform may support one or more operating systems 30. The platform routes the flow of communication between processes and nodes. The platform is shown as communication links interconnecting the processors to the nodes 1–6. In FIG. 1, the communication links 68, 70 write data from node 1 and node 2 to the hub 32. The writing of the data is transparent to the operating system 30 and the method of interconnection can be any type of connection capable of achieving the results of the subject invention.

Each of the processors contains data stored within the memory sources associated with the processes. The data may include addresses of other processes to be executed, addresses of other data to be used, and data sets for use during execution of the process. The processes may be stored in one of the processors and may utilize data stored on a different processors.

Figure 3:
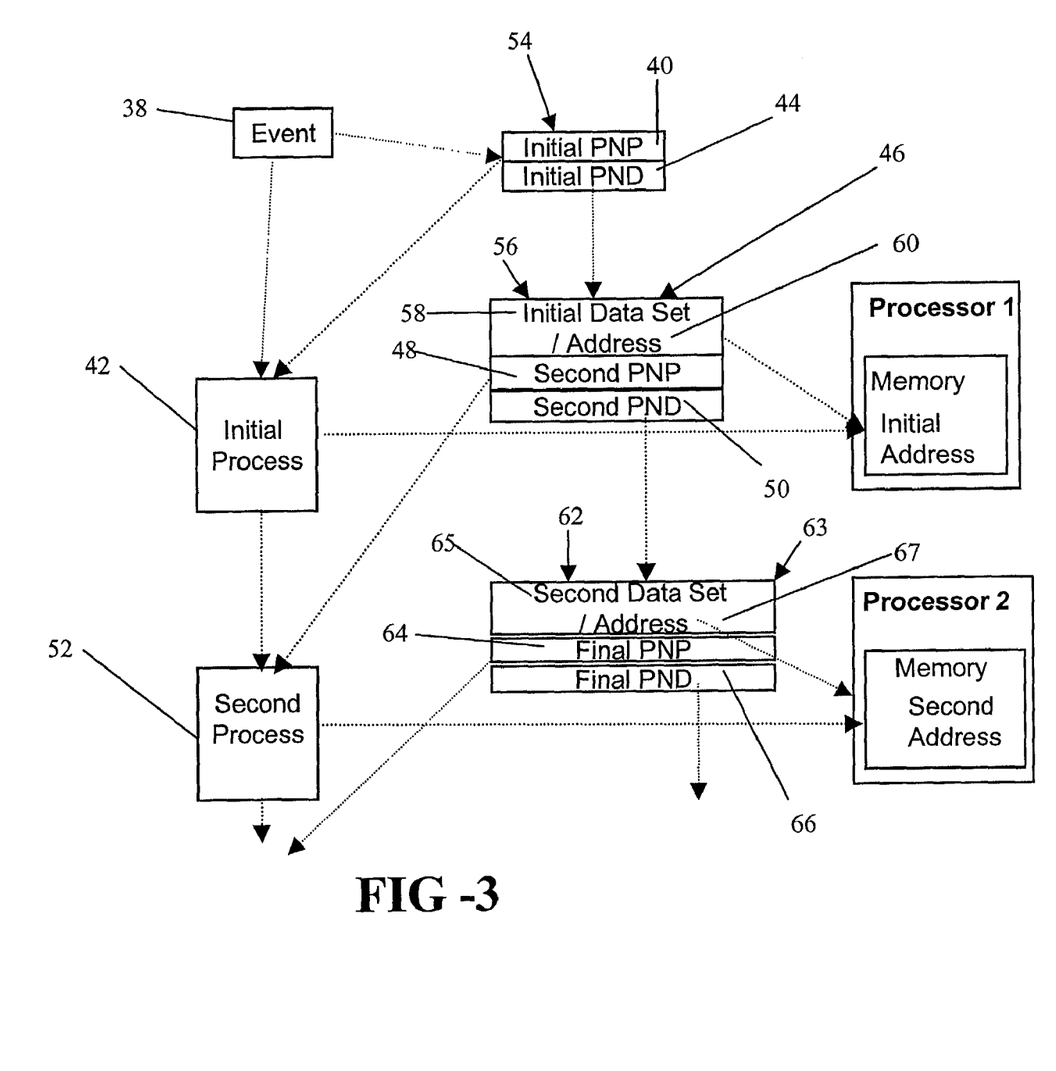
FIG. 3 is a schematic view of the operating system passing communication between an initial process and a second process in response to detecting an event.

The operating system 30 described above is capable of performing the method of the subject invention. Turning to FIG. 3, the method includes the step of detecting an event 38 within the operating system 30. The event 38 may be at any moment of time at which a specified change of state occurs. The event 38 is preferably the detection of a synchronization signal, thereby ensuring all the processes start simultaneously at a well-defined moment in time. The event 38 could be generated locally from the node 1–6 having the process, if desired. One type of an event 38 that may be detected is a hardware interrupt, such as pressing of a key on a keyboard. The processor detects the hardware interrupt and the hardware interrupt tells the processor that a key has been pushed. It is to be understood that there are many types of events which may be detected other than hardware interrupts.

Next, the operating system 30 extracts an initial process address 40 from one of the memory sources to determine a location of an initial process 42 in response to detecting the event 38. The initial process address 40, or initial pointer to a next process (PNP), is data which can be stored on any one of the memory sources. The data may include multiple lines of executable code for manipulating other data. The initial PNP 40 points the system to the location of executable code to be executed, i.e., tells the system where the executable code is located.

The operating system 30 extracts an initial data address 44 from one of the memory sources to determine a location of initial data 46 to be used in the initial process 42 in response to detecting the event 38. The initial data address 44, or initial pointer to next data (PND), is also data which can be stored on any one the memory sources. The initial PND 44 points to the location in one of the memory sources which contains data for use in the executing process. The data located at the initial PND 44 location includes a second process address 48, or second PNP 48, and a second data address 50, or second PND 50. The data located at the initial PND 44 may also include an initial data set 58. It is to be understood that the PNP, PND, and data address are pointers, or addresses. The labeling of the processes, data, and the like with the terms "initial" and "second" are purely for illustrative purposes and in no way intended to limit the subject invention. The method of the subject invention may be used to execute thousands of processes within a short period of time wherein each of the processes may be executed in the manner described herein.

The step of detecting the event 38 is further defined as retrieving an initial parameter block 54 from one of the memory sources. The initial parameter block 54 includes the initial PNP 40 and the initial PND 44. The initial parameter block 54 may also include the initial data set 58, however, the preferred embodiment only includes the initial PNP 40 and initial PND 44.

Once the operating system 30 knows which process is to be executed and which data to use, the operating system 30 executes executable code of the initial process 42 located at the initial process address 40. Next, the second process address 48, or second PNP 48, is extracted from one of the memory sources to determine a location of a second process 52 to execute prior to the completion of the execution of the executable code of the initial process 42. The step of extracting the second PNP 48 from one of the memory sources is further defined as extracting the second PNP 48 from the initial data 46 at the initial data address 44. Therefore, the second PNP 48 is stored as part of the initial data 46 located at the initial data address 44.

The operating system 30 also extracts the second data address 50, or second PND 50, from one of the memory sources to determine a location of second data 63 to use in the second process 52 prior to the completion of the execution of the executable code of the initial process 42. The step of extracting the second PND 50 from one of the memory sources is further defined as extracting the second PND 50 from the initial data 46 at the initial data address 44.

The extracting of the second PNP 48 and the second PND 50 is further defined as extracting a first parameter block 56 located at the initial PND 44. The first parameter block 56 preferably includes an initial data set 58 for use in the initial process 42. The operating system 30 retrieves the initial data set 58 from the initial data 46 located at the initial data address 44, or the first parameter block 56, for manipulation during execution of the initial process 42. The method further includes the step of processing the initial data set 58 during execution of the executable code to define an initial processed data set. Also stored in the first parameter block 56 is an initial processed data address 60 which is extracted from one of the memory sources and the initial processed data set is written to the initial processed data address. The initial data set 58, or other data set, may include parameters or values for use during the execution of the process. Such parameters may include constants, such as Pi=3.141592 . . . or other values written to the first parameter block 56 by other processes.

The operating system 30 completes execution of the initial process 42 and passes communication to the second process 52 located at the second PNP 48. Then, the executable code of the second process 52 located at the second PNP 48 is executed with the second data 63 located at the second PND 50. A second parameter block 62 is located at the second PND 50 which contains a second data set 65. The second data set 65 is retrieved from the second data 63 located at the second data address 50 and is processed during execution of the executable code to define a second processed data set. Then a second processed data address 67 is extracted from one of the memory sources and the second processed data set is written to the second processed data address 67. The second processed data address 67 may send the second processed data set to any of the nodes 1–6 or be utilized in other executing processes.

To summarize, the event 38 is detected and retrieves the initial PNP 40 and PND. The operating system 30 executes the initial process 42, fetches the data set and data set address, processes the data set, and writes the processed data set to the processed data set address. Next, the second PND 50 is fetched so the second process 52 knows the location of the second data, and then the second PNP 48 is fetched and execution is passed to the process address the second PNP 48 specifies. Since the operating system 30 knows where to proceed prior to completing execution of the process, the operating system is a fast and flexible real-time system. Since the PNP and PND are established by the process before the process which uses them, the operating system 30 can implement some extremely powerful mechanisms.

The executable code, which includes the initial process 42 and the second process 52, is data contained in one of the memory sources, and the data for each process is, also, data contained in one of the memory sources. Therefore, processes are able to write to each other's data and executable code, as necessary. The writing performed by the processes is able to modify the data set stored in the associated parameter blocks for any of the processes.

During the execution of the second process 52, a final PNP 64 is extracted from one of the memory sources to determine a location of a final process to execute. Once the executable code of the final process located at the final process address 64 is executed, the operating system 30 halts communication across the operating system 30 until the system detects another event 38. The operating system 30 may perform as many processes as desired until reaching the final process. Additionally, the final process may be incorporated into the executable code of the second process 52. The final process is described as being executed after the second process 52, however, it is to be understood that any number of processes may precede the final process. It is to be further understood that the operating system 30 may be configured to operate without such a final process.

Figure 2A:
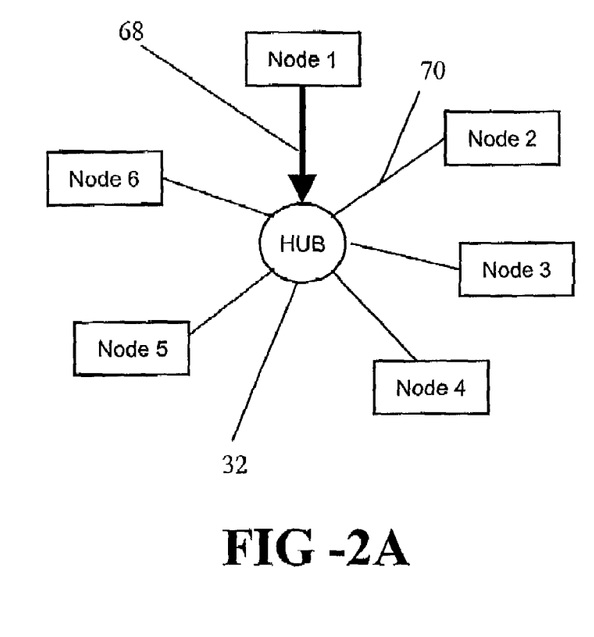
FIG. 2A is a schematic view of the operating system of FIG. 1 illustrating an incoming transmission from a node.
Figure 2B:
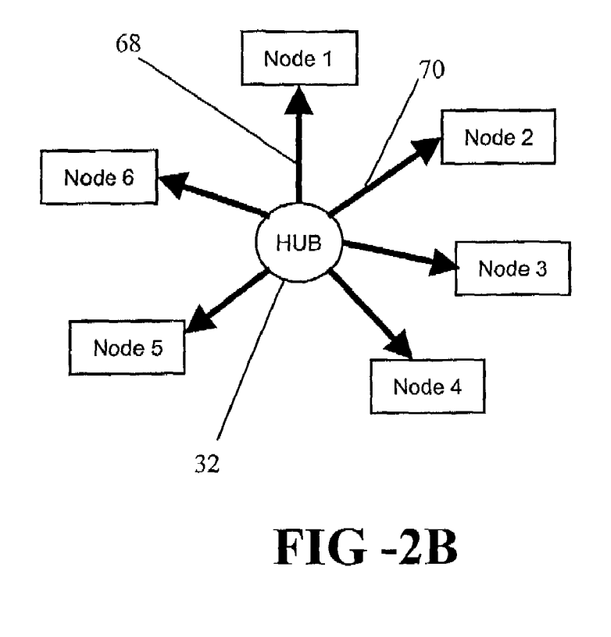
FIG. 2B is a schematic view of the operating system of FIG. 2A broadcasting to all nodes from the hub.

Referring to FIGS. 2A and 2B, another feature of the method of the subject invention is the ability of one process to write processed data to a plurality of processes. The process extracts a plurality of processed data addresses and writes the second processed data set to the plurality of processed data addresses. This is commonly referred to a broadcast of data. Alternately, the hub 32 may write the data for all the nodes 1–6 without the plurality of specifying the addresses. In other words, the hub 32 writes the data every where without having to know the extent of the system. The hub 32 may also generate an event in each one of the nodes 1–6 in response to the generation of the data. FIG. 2A illustrates a signal being generated at a node and being sent to the hub 32. In FIG. 2B, the hub 32 broadcasts the signal to the plurality of addresses. The broadcast can execute a process which will generate an event 38 in all the other nodes and processes. As another feature, the operating system 30 is capable of sending data originating from the hub 32 or from one of the nodes in this manner. The process stored in one of the processors of the nodes, writes the data to the plurality of processed data addresses, thereby sending the data to all the other nodes. The broadcast is useful for sending a global message, a command, or a request across the entire operating system 30 without necessarily having to know the extent of the operating system 30 and without expending time sending multiple signals.

Figure 4:
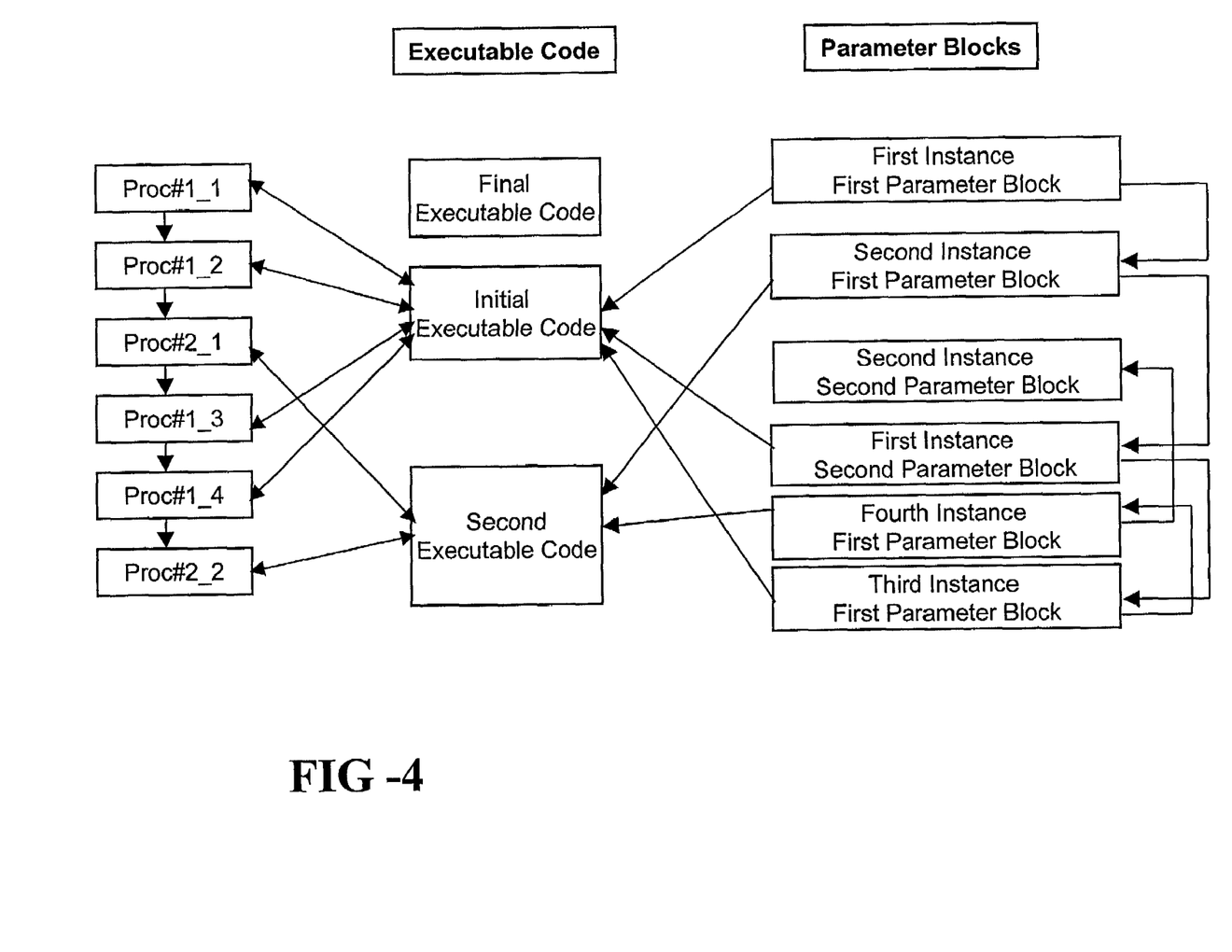
FIG. 4 is a schematic view of the operating system utilizing different data with the same process.

Referring to FIG. 4, the executable code and the parameter blocks have been separated for clarity. It is to be understood that the executable code and data may be mixed in any of the memory sources. A first process is executed three different times and each time uses a different parameter block having different data. Therefore, there only needs to be one copy of the executable code for the first process stored in any of the memory sources.

Another feature of the subject invention is that the executable code for a process can be executed with a plurality of different data located at a plurality of different data addresses. The execution of the same executable code with a different data set is referred to as an instance. Therefore, it is only necessary to store the executable code once in the memory sources, thereby allowing better usage of the size of the memory source. FIG. 4 shows the first process being executed twice, each time with a different instance of a first parameter block. Then, a second process is instanced followed by two more instances of the first process. Lastly, the second process is instanced a second time. The first instance of the first process uses first executable code with the first instance first parameter block. The PND from the first instance first parameter block points to the second instance first parameter block to use with the initial executable code during the second instance of the first process. The PND from the second instance first parameter block points to first instance second parameter block, the next PND points to the third instance first parameter block, the next PND points to fourth instance first parameter block, and finally the next PND points to the second instance second parameter block. The arrows between the instances of the processes illustrate the PNP's and the arrows between the parameter blocks illustrate the PND's. The arrows between the executable code and the parameter blocks link the instance of data to be used with the executable code and the arrows between the processes and the executable code illustrate the code executed during the process.

The method further includes the step of positioning the initial process 42 and the second process 52 in an execution order. The execution order is the order which the process will be executed. The execution order may include a plurality of processes positioned in the execution order. The method of subject invention further includes the steps of extracting a plurality of initial process addresses and a plurality of initial data addresses to define a plurality of execution orders and executing the plurality of execution orders at the same time. After the execution order is set, the PNP and the PND are established for each of the plurality of processes. For example, the initial process 42 is positioned before the second process 52 and therefore the communication passes from the initial process 42 to the second process 52. In order for the communication to pass, the data located at the initial PND 44 must include the PNP and the PND of the second process 52.

The execution order can be manipulated such that order of the processes being executed is modified. Once the execution order is modified, the PNP and the PND must be re-established for each of the manipulated processes. One example of manipulating the execution order would be positioning the second process 52 before the initial process 42. In order to re-establish the execution order, the initial PNP 40 and the initial PND 44 would be replaced with the second PNP 48 and the second PND 50 in the initial parameter block 54. The second parameter block 62 would then receive the initial PNP 40 and the initial PND 44 for executing the initial process 42 upon the completion of the second process 52. The operating system 30 would then detect the event 38, retrieve the second PNP 48 and the second PND 50 from the initial parameter block 54, execute the second process 52, retrieve the initial PNP 40 and the initial PND 44 from the second parameter block 62, and execute the initial process 42.

The executable code includes functions or modules, described below, which can either be stored permanently in a node 1–6, or written to the node 1–6 to reflect a required configuration. The executable code is binary compatible with the processor in the node 1–6 where the executable code is to be executed. The executable code can reside anywhere in any of the memory sources and can be relocateable to different memory sources, as necessary. Functions include non-divisible software functionality, e.g. a single mathematical function—such as multiplication.

Modules are a convenient collection of functions in an object. The object can perform different combinations of functions. A library is stored on at least one memory source such that the library includes a collection of modules and functions which are appropriate to a particular application, for example a "math library", or a "signal processing library". The operating system 30 further includes objects which are one or more functions and/or modules plus their associated parameter blocks and/or some connectivity which, together, provide a well defined set of functionality. Objects may encapsulate one or more other objects.

Figure 5:
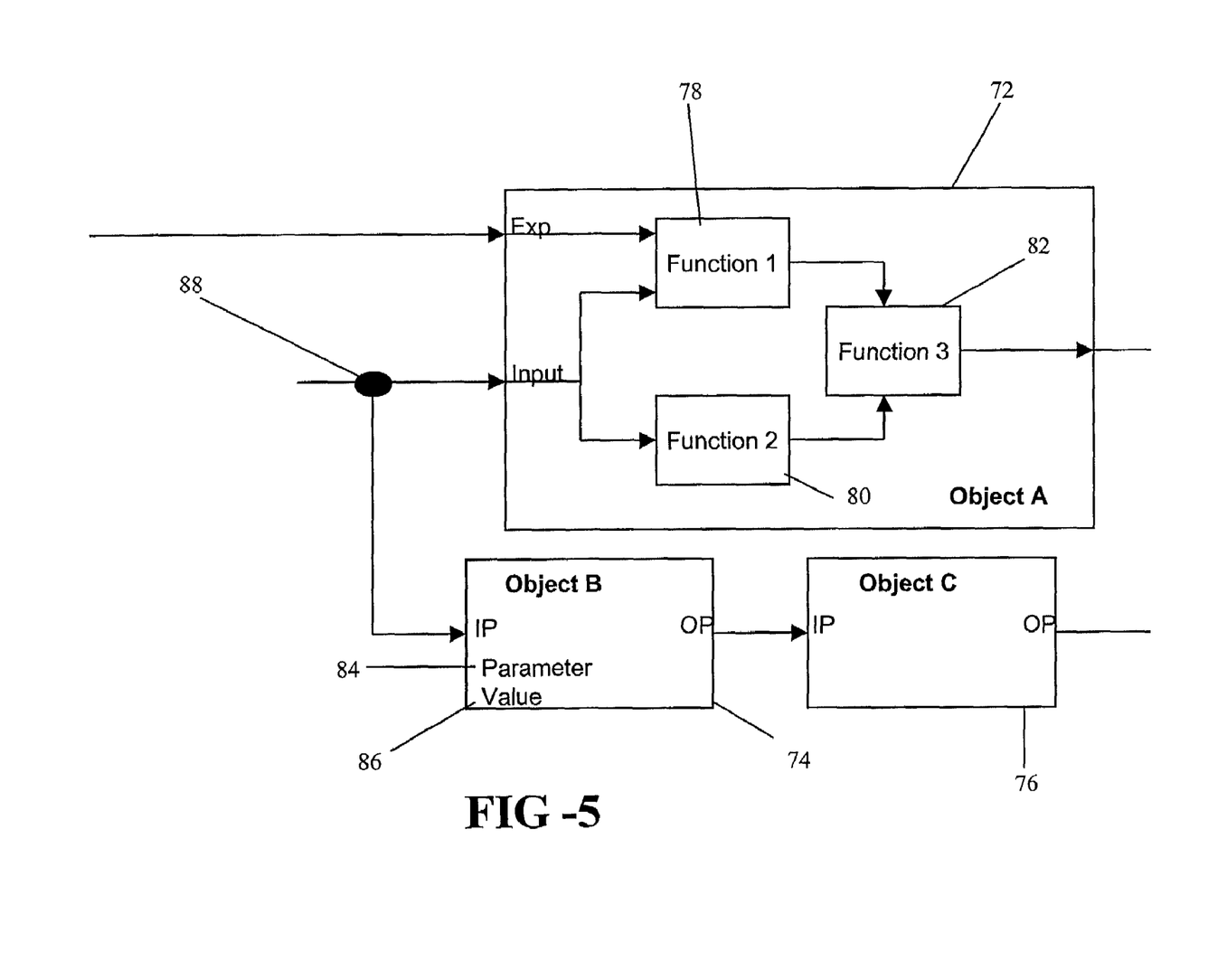
FIG. 5 is a circuit schematic view of user objects, which represent an execution order of the operating system.
Figure 6:
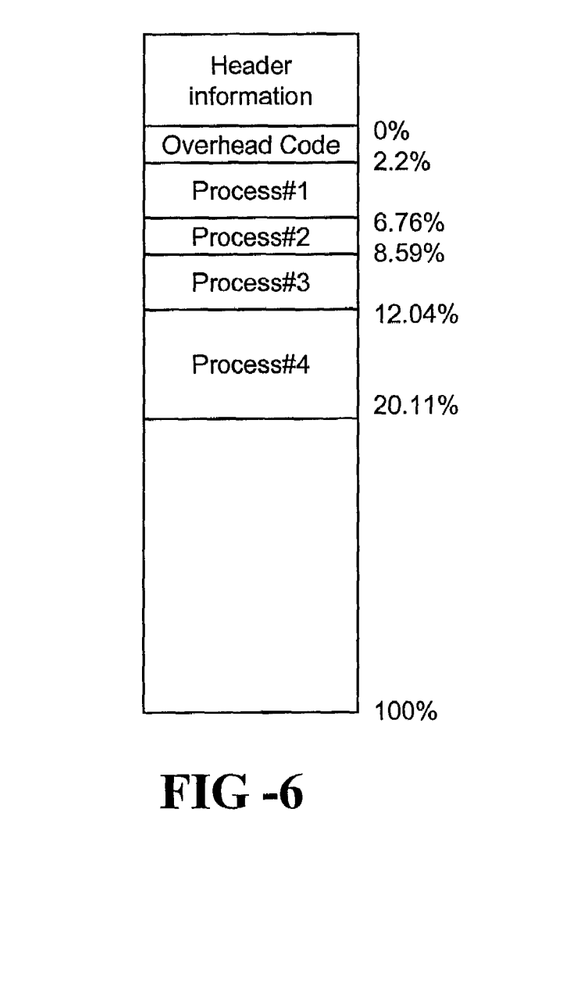
FIG. 6 is a schematic view of an execution order displayed to the user.
Figure 7:
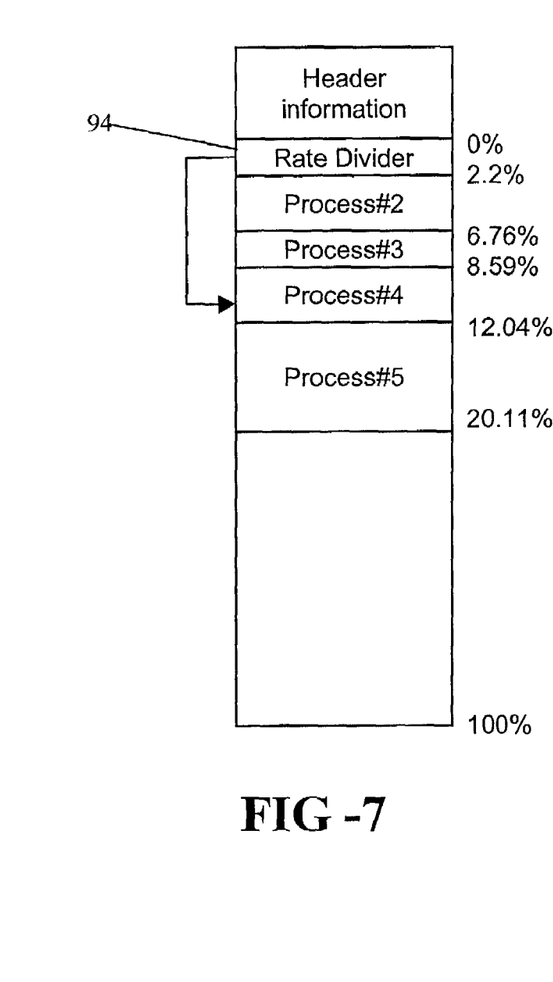
FIG. 7 is a schematic view of the execution order of FIG. 6 wherein a condition is measured and the execution order is altered in response to the condition being present.

The processes are displayed to a user such that the user can modify the position of the processes, as shown in FIGS. 5–7. Referring to FIG. 5, the processes are shown as a circuit schematic diagram, which shows the interconnections between objects, such that the objects form the processes. In the preferred embodiment, a display is connected to the operating system 30 for displaying the execution order. The user can move the processes around the display as is known in the art by clicking and dragging. As the user moves the processes around, the PNP's and PND's are re-established based upon the order which the user positions the processes. FIG. 5 illustrates an example of a process having three objects, object A 72, object B 74, and object C 76. Each of the objects is a different sub-process within the process. Object A 72 includes three functions: function 1 78, function 2 80, and function 3 82, each for manipulating data. The user is able to modify the location of these processes by moving the objects on the display.

Another feature of the subject invention allows the execution order to be modified by modifying at least one of the initial process address 40 and the second process address 48 to a different process address to define a different execution order of the initial and second processes. This can be done while the operating system 30 is executing or prior to detection of the event 38.

Once the execution order has been displayed to the user, the user is able to modify the data located at the data address associated with the displayed process. The user can modify the data sets of the processes, such as changing the parameters and values as described above. The user could modify either the parameters 84 and the values 86 as displayed in object B 74. However, there are fixed processes, which are stored in one of the memory sources, wherein data associated with the fixed processes remains unchanged, even though the fixed processes are displayed to the user. An example of the fixed processes would be functions 1–3 78, 80, 82 in FIG. 5. The fixed processes include Boolean and mathematical operators. Other fixed processes include functions and module binaries, as described above. Each individual binary may be encapsulated in an object which may also include the processes' executable code, along with parameters, such as variables, memory size and type required for data structures. The object, which encapsulates the executable code, is non-divisible and cannot be modified by the user. One such non-divisible object is a dot primitive 88, which distributes the signal to more than one destination. The dot primitive 88 has one input from a previous process and a list of destination addresses which the signal is written to.

The objects that the user can modify are user objects. User objects allow one or more objects and connectivity inside another object to be embedded within other user objects. The user can create the user object by adding input and output connections and building the internal functionality as desired. The user may incorporate both primitives and existing user objects into the user objects.

The user is able to name the user object as desired. Additionally, the user can choose what properties are visible on the user object. The user object, object A 72, displays detail of the other objects and the objects' connectivity. In order to be able to display the execution order, the system must take a global "snap-shot" of the execution order connectivity at the desired interval. An agent process, local to each node 1–6, is distributed for gathering specific data, such as PNP and PND in response to a broadcast. The agent process writes the gathered data back to the operating system 30. The operating system 30 can therefore display the execution order in real-time. The gathering of the specific data by the agent process is an indivisible process, as described above.

FIG. 6 illustrates another embodiment which displays the processor and the associated memory source to the user. The displayed memory source shows the allocation of memory space to the processes and the associated parameter blocks (not shown). The user can modify which processor executes which process or the memory could be automatically allocated by the operating system 30. The operating system 30 may automatically position the processes based upon an optimized configuration of processes among the various processors. Alternately, the user can manipulate the position of the processes based upon the size of the memory source of each of the processors. This allows the user to move processes from one processor that may be operating at capacity to another processor that is operating below capacity. The processes displayed in the memory source may not illustrate the execution order of the operating system 30, since the process may by writing to other processors. FIG. 6 also illustrates the allocation of the processing resources, or processor time, for each of the processors. As processes are added to the processor, an indicator displays the amount of processor resources that have been consumed. For example, with the four processes, 20.11% of the processor resources are utilized.

Furthermore, the execution order may remain the same, but the data used during execution of the process may be modified in response measuring the predetermined condition. When the condition is measured, at least one of the initial PND 44 and the second PND 50 is modified to retrieve different data addresses during the execution of subsequent processes.

Another embodiment for modifying the execution order includes establishing a sub-execution order of processes when the sub-execution order of processes may be modified without interrupting the execution order of the operating system 30. After the sub-execution order is established, the sub-execution order is implemented into the execution order by altering the second PNP 48 and the second PND 50 located at the initial PND 44 and writing the altered PNP and the altered PND of the sub-execution order into the initial data address 44. The sub-execution order or processes is executed and returns to the execution order once each of the processes of the sub-execution order are executed. In order to return to the execution order, the second PNP 48 and the second PND 50 are written into one of the sub-execution data addresses. The second PNP 48 and the second PND 50 are written into the sub-execution, preferably, prior to writing the sub-execution PNP and PND into the initial parameter block 54. Once the sub-execution PNP and PND are written, the operating system 30 is triggered by a new event and begins at the begging of the execution order. The triggering of the new event ensures that the processes do not stop executing. When processes are modified between very different locations in the execution order, the processors are out-of-sync, and require the operating system 30 to be start from the beginning of the execution order, thereby implementing the new execution order.

The modification of the execution order may be in response to measuring a predetermined condition during execution of the second process 52 and modifying at least one of the initial process address 40 and the second process address 48 is modified to retrieve a different process address during the execution of subsequent processes. A Real Time Sequencer (RTS) may be incorporated into the execution order to measure the predetermined condition. The RTS is extremely fast and consumes hardly any execution time. The RTS could be used undertake whole tests of the operating system 30, as desired. The RTS may be displayed to the user having a plurality of inputs for the user to initiate a start and a stop to the sequencer. Such inputs may include standard play, pause, and stop buttons. The RTS could start a machine attached to one of the nodes, perform the test, gather data, react appropriately as the user has configured to the detected events, establish the test is complete, and switch off the machine. It is to be understood that the condition can be measured during any process, but is described for clarity as occurring during the second process 52.

After the condition is detected, the RTS may modify at least one of the initial PNP 40 and the second PNP 48 by extracting a different PNP from one of the memory sources whereby the process at the different PNP has executed. In other words, the different PNP points to a process higher up in the execution order. Alternately, the RTS may modify at least one of the initial PNP 40 and the second PNP 48 by extracting a different process address from one of the memory sources whereby the process at the different process address is to be executed, i.e., a process lower in the execution order.

Referring to FIG. 7, an execution frequency is measured by a rate divider 94 utilizing the if primitive. If the execution frequency is below a predetermined count, then the execution order is modified. A counter primitive maintains a count by adding a count increment each time the execution order is executed. The output of the counter primitive is used by the if primitive to create a desired result. Once the counter primitive counts the predetermined count, the if primitive will be arranged to bypass itself and the counter process. The execution order may further be modified in response to measuring the execution frequency of one of the processes and modifying a process address stored in a data address associated with the process such that a different process executes when a predetermined number of executions is measured. The rate divider 94 updates a process count each time it is executed and, until this count reaches a specific number, passes execution each time to the next PNP, but when the count equals the number it resets the count and passes execution to a different PNP. Therefore the frequency that the different PNP is executed is number times less than the frequency which the rate divider 94 function is executed. As shown in FIG. 7, the execution order flows around processes 2 & 3 and are only executed when the rate divider 94 count is reset, subdividing the event 38 frequency seen by Processes 2 & 3.

Figure 8A:
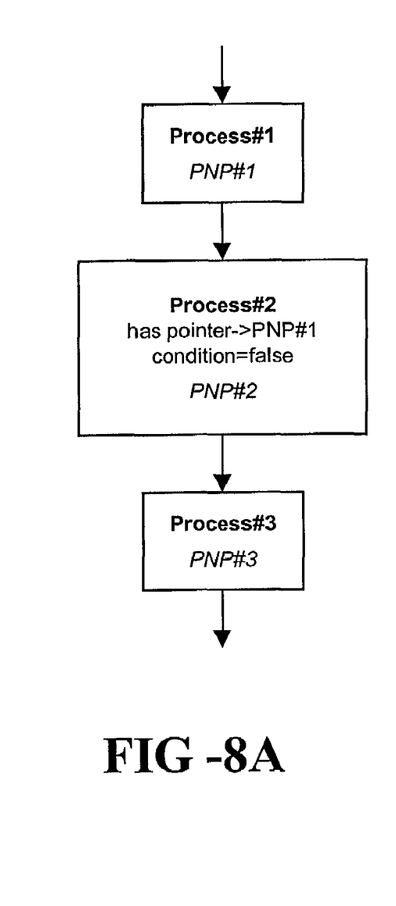
FIG. 8A is a schematic view of an execution order having a first, second, and third process.
Figure 8B:
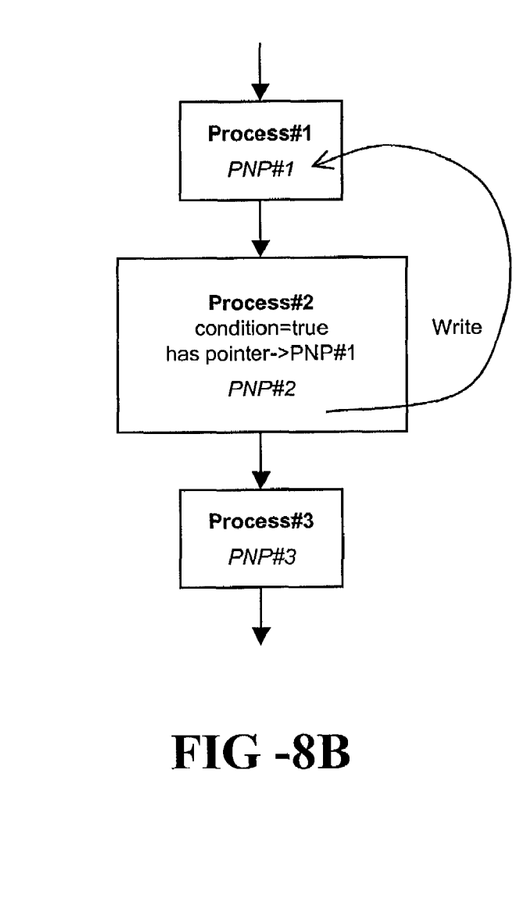
FIG. 8B is a schematic view of the execution order of FIG. 8A measuring a condition during the second process.
Figure 8C:
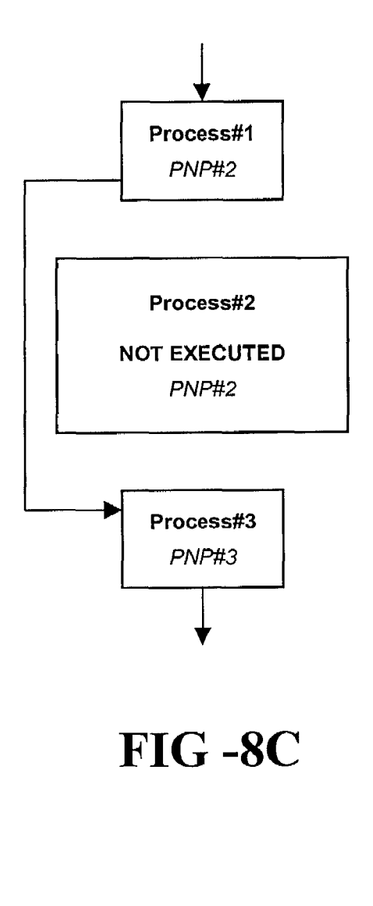
FIG. 8C is a schematic view of the execution order of FIG. 8A being modified by the second process in response to the condition being present.

Referring to FIG. 8A, an execution order is shown having processes 1–3 and executing in that order. Process #1 contains PNP #1, process #2 contains PNP #2, and process #3 contains PNP #3. For clarity, the PNP's are shown in the process, but it is to be understood that the PNP's are preferably stored in the associated parameter blocks. After execution of process #1, the signal is passed to process #2. Process #2 measures a condition, and if the condition is false, or not present, the signal passes according to PNP #2 to process #3. If process #2 measure the condition as true, i.e., present, as in FIG. 8B, process #2 writes PNP #2 into process #1. Now, process #1 has PNP #2 also as in FIG. 8C. Process #2 then passes the signal to process #3. The next time the execution order is executed, process #1 bypasses process #2 and executes process #3.

In order for the RTS to accomplish the bypassing of the process, the RTS must execute special processes. The special process includes primitive objects: set primitives, wait for primitives, and if primitives. The set primitive sets or modifies any number of properties in any parameter block. The set primitive can perform all the requested modifications in parallel, i.e., at the same instant. The wait for primitive executes the sequence and waits for one or more conditions to be detected. Multiple conditions may be separated by boolean operators, such as AND, OR, AND NOT, OR NOT, XOR, NOT XOR, etc. The condition may contain properties and operators such as >, >=, =, <=, <. An example condition having boolena operators would be Node4:: Signal8>Node2::Signal2 AND Node1::Input9 <=Node1:: Mean. The wait for primitive may display to the user any changes of state once a specified time has elapsed. For example, after 10 seconds, the processes may display the status of the execution to the user. While, the wait for primitive is waiting, the execution order is continuing to be executed by passing the wait for primitive. The if primitive can be used to continue the execution while waiting. The if primitive allows the operating system 30 to continue executing thereby eliminating any delays while the process is waiting.

Figure 9:
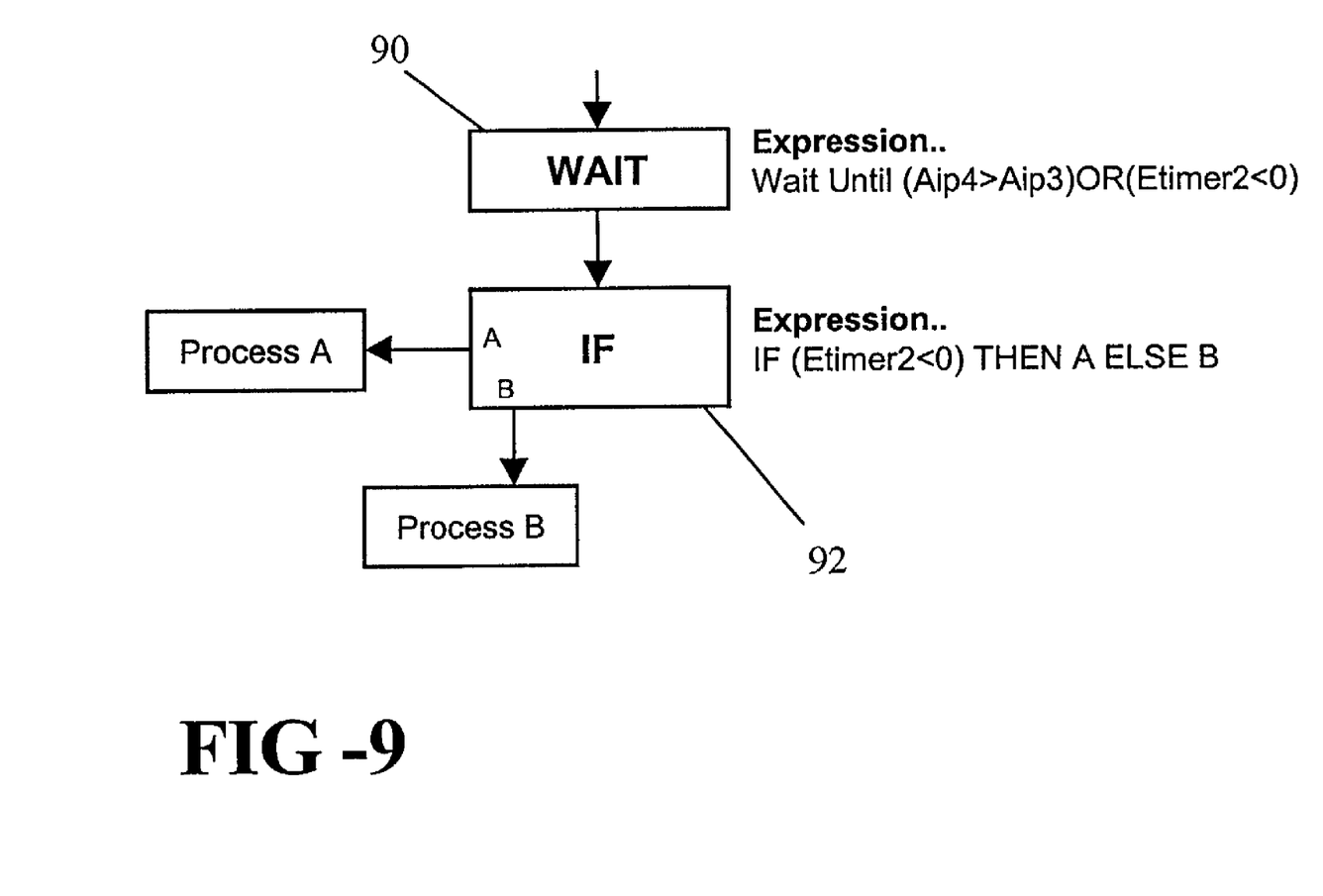
FIG. 9 is a schematic view of a sequencer performing other primitives.

Referring to FIG. 9, a wait primitive 90 and an if primitive 92 are illustrated as part of the RTS. The signal enters the wait primitive 90 and the wait primitive 90 waits for either a condition to be present or for a time period to pass. If the condition is present, then the if primitive 92 sends the signal to B. If the condition is not present, but the time has passed, the signal is passed to A. This allows the operating system 30 to continue executing while the wait primitive 90 is waiting for the condition to be present.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of communicating across an operating system comprising a plurality of nodes with each node having one or more processors capable of executing a plurality of processes and having a plurality of memory sources, said method comprising the steps of:

detecting an event within the system;

extracting an initial process address from one of the memory sources to determine a location of an initial process in response to detecting the event;

extracting an initial data address from one of the memory sources to determine a location of initial data to be used in the initial process in response to detecting the event;

executing executable code of the initial process located at the initial process address; and extracting a second process address from one of the memory sources to determine a location of a second process to execute prior to the completion of the execution of the executable code of the initial process.

2. A method as set forth in claim 1 further including the step of extracting a second data address from one of the memory sources to determine a location of second data to use in the second process prior to the completion of the execution of the executable code of the initial process.

3. A method as set forth in claim 2 wherein the step of extracting the second process address from one of the memory sources is further defined as extracting the second process address from the initial data at the initial data address.

4. A method as set forth in claim 3 wherein the step of extracting the second data address from one of the memory sources is further defined as extracting the second data address from the initial data at the initial data address.

5. A method as set forth in claim 4 further including the step of retrieving an initial data set from the initial data at the initial data address for manipulation during execution of the initial process.

6. A method as set forth in claim 5 wherein the step of detecting the event is further defined as retrieving an initial parameter block, the initial parameter block includes the initial process address and the initial data address.

7. A method as set forth in claim 6 further including the step of executing executable code of the second process located at the second process address with the second data located at the second data address.

8. A method as set forth in claim 7 further including the step of positioning the initial process and the second process in an execution order.

9. A method as set forth in claim 8 further including the step of extracting a final process address from one of the memory sources to determine a location of a final process to execute and further including the step of executing executable code of the final process located at the final process address to halt communication across the operating system until the system detects another event.

10. A method as set forth in claim 8 further including the steps of measuring a predetermined condition during execution of the second process and modifying at least one of the initial data address and the second data address to retrieve different data addresses during the execution of subsequent processes.

11. A method as set forth in claim 10 further including the steps of measuring an execution frequency of one of the processes and modifying a process address stored in a data address associated with the process such that a different process executes when a predetermined number of executions is measured.

12. A method as set forth in claim 8 further including the step of modifying at least one of the initial process address and the second process address to a different process address to define a different execution order of the initial and second processes.

13. A method as set forth in claim 8 further including the steps of measuring a predetermined condition during execution of the second process and modifying at least one of the initial process address and the second process address to retrieve a different process address during the execution of subsequent processes.

14. A method as set forth in claim 13 wherein the step of modifying at least one of the initial process address and the second process address is further defined as modifying at least one of the initial process address and the second process address by extracting a different process address from one of the memory sources whereby the process at the different process address has executed.

15. A method as set forth in claim 13 wherein the step of modifying either one of the initial process address and the second process address is further defined as modifying at least one of the initial process address and the second process address by extracting a different process address from one of the memory sources whereby the process at the different process address is to be executed.

16. A method as set forth in claim 7 further including the steps of positioning a plurality of processes in an execution order and establishing a process address and the data address for each of the plurality of processes.

17. A method as set forth in claim 16 further including the steps of manipulating the position of the processes such that execution order is modified and re-establishing the process address and the data address for each of the manipulated processes.

18. A method as set forth in claim 17 further including the step of displaying the execution order to a user such that the user can modify the position of the processes.

19. A method as set forth in claim 18 further including the step of displaying the memory source of each of the processors to the user such that the user can manipulate the position of the processes based upon each processor.

20. A method as set forth in claim 19 further including the step of displaying the processes to a user such that the user can modify the data located at a data address associated with the displayed processes.

21. A method as set forth in claim 20 further including the step of storing fixed processes in one of the memory sources wherein data associated with the fixed processes remains unchanged.

22. A method as set forth in claim 16 further including the step of establishing a sub-execution order of processes when the sub-execution order of processes may be modified without interrupting the execution order of the operating system.

23. A method as set forth in claim 22 further including the steps of implementing the sub-execution order by altering the second process address and the second data address located at the initial data address and writing the altered process address and the altered data address of the sub-execution order into the initial data address.

24. A method as set forth in claim 23 further including the steps of executing processes of the sub-execution order and returning to the execution order once each of the processes of the sub-execution order are executed.

25. A method as set forth in claim 24 wherein the step of returning to the execution order is further defined as writing the second process address and the second data address into one of the sub-execution data addresses.

26. A method as set forth in claim 25 further including the step of beginning the operating system at the beginning of the execution order in response to detecting a new event and implementing the sub-execution order into the execution order.

27. A method as set forth in claim 5 further including the step of processing the initial data set during execution of the executable code to define an initial processed data set.

28. A method as set forth in claim 27 further including the steps of extracting an initial processed data address from one of the memory sources and writing the initial processed data set to the initial processed data address.

29. A method as set forth in claim 28 further including the steps of retrieving the second data set from the second data located at the second data address and processing the second data set during execution of the executable code to define a second processed data set.

30. A method as set forth in claim 29 further including the steps of extracting a second processed data address from one of the memory sources and writing the second processed data set to the second processed data address.

31. A method as set forth in claim 30 wherein the step of extracting the second processed data address is further defined as extracting a plurality of processed data address and writing the second processed data set to the plurality of processed data addresses.

32. A method as set forth in claim 1 further including the steps of extracting a plurality of initial process addresses and a plurality of initial data addresses to define a plurality of execution orders and executing the plurality of execution orders at the same time.

33. A method as set forth in claim 2 wherein the steps of extracting the initial data address and extracting the second data address is further defined as extracting a plurality of initial data addresses and extracting a plurality of second data addresses.

34. A method as set forth in claim 2 further including the step of executing executable code for a process with a plurality of data located at a plurality of data addresses.

35. A method of communicating across an operating system comprising a plurality of nodes with each node having one or more processors capable of executing a plurality of processes and having a plurality of memory sources, said method comprising the steps of:

detecting an event within the system;

extracting an initial process address from one of the memory sources to determine the location of an initial process in response to detecting the event;

extracting an initial data address from one of the memory sources to determine the location of initial data to be used in the initial process in response to detecting the event;

executing executable code of the initial process;

retrieving the initial data from one of the memory sources at the initial data address;

continuing execution of executable code of the initial process with the retrieved initial data to define an initial processed data set;

extracting an initial processed data address from one of the memory sources;

writing the initial processed data set to the initial processed data address;

extracting a second process address from one of the memory sources to determine the location of a second process to execute prior to the completion of the execution of the executable code of the initial process;

extracting a second data address from one of the memory sources to determine the location of second data to use in the second process;

executing executable code of the second process;

retrieving the second data from one of the memory source at the second data address;

continuing execution of executable code of the second process with the retrieved second data to define a second processed data set;

extracting a second processed data address from one of the memory sources;

writing the second processed data set to the second processed data address;

extracting a final process address from one of the memory sources to determine the location of a final process to execute;

executing executable code of the final process to halt communication of the system until the system detects the event.

* * * * *